A. CALLESON.
BOTTOM SEALING MACHINE.
APPLICATION FILED OCT. 6, 1913.
1,153,174.
Patented Sept. 7, 1915.
6 SHEETS—SHEET 4.
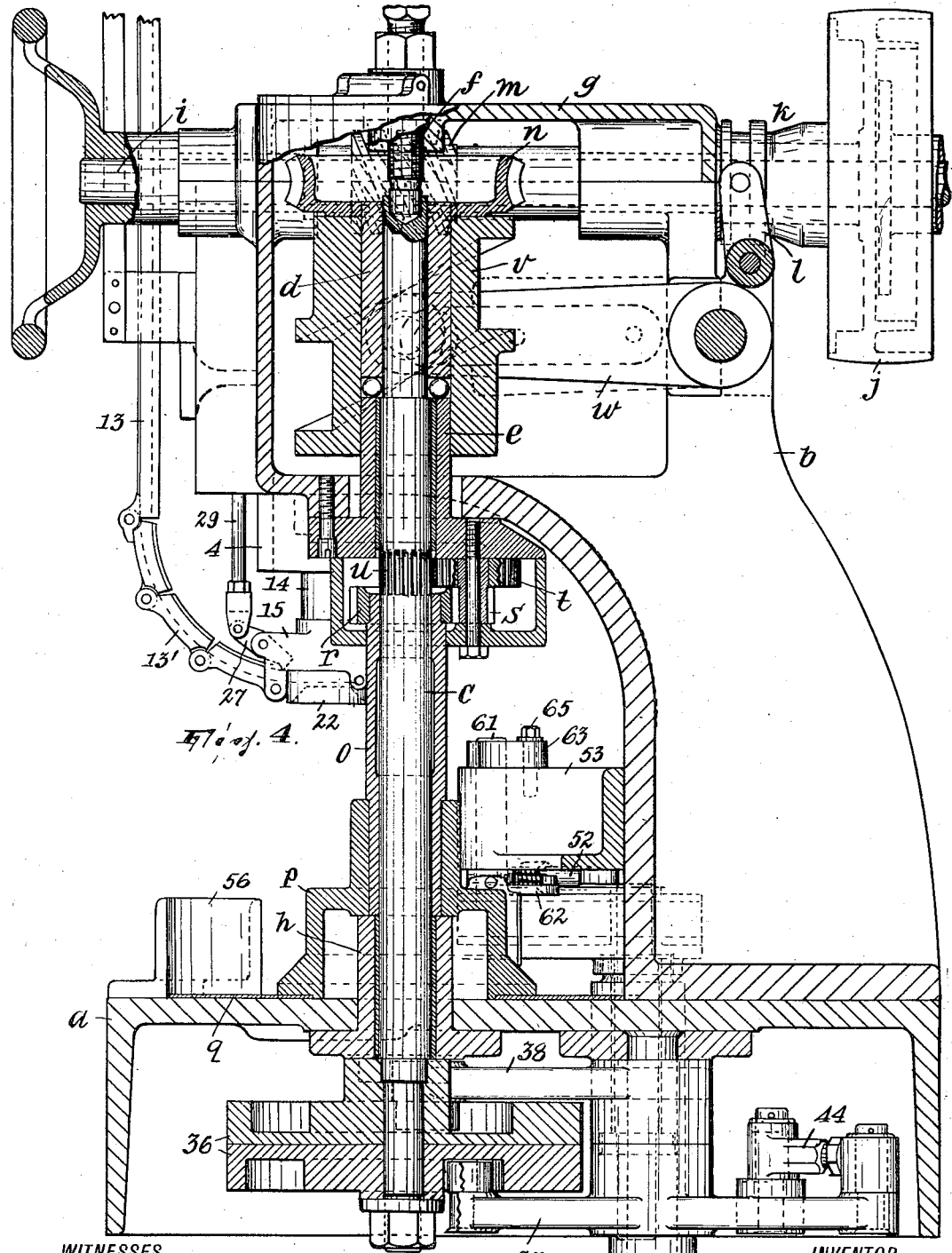
WITNESSES
Wm Bell.
Elsie Kaufmann.
INVENTOR,
Amos Calleson,
BY
ATTORNEY.

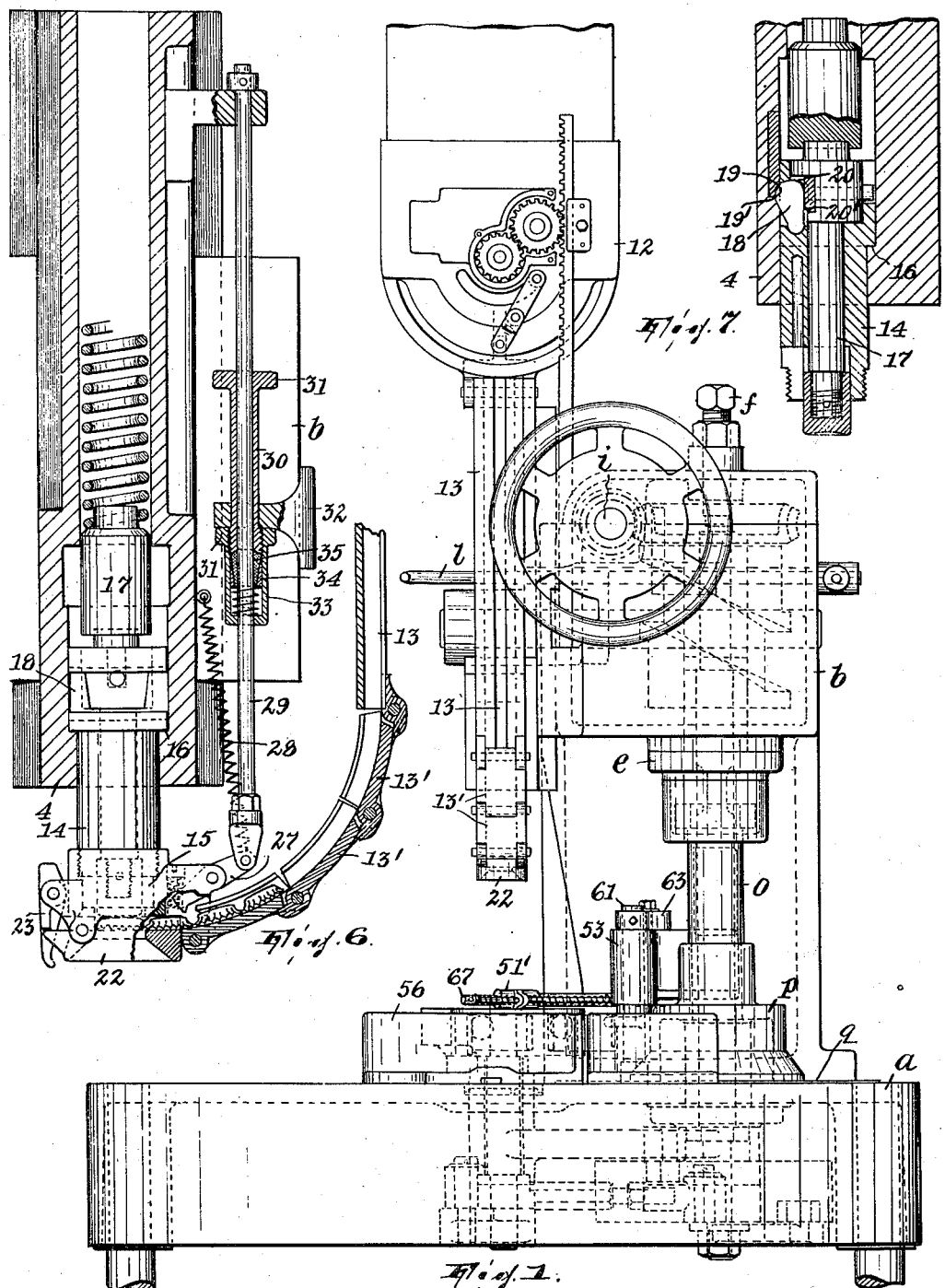

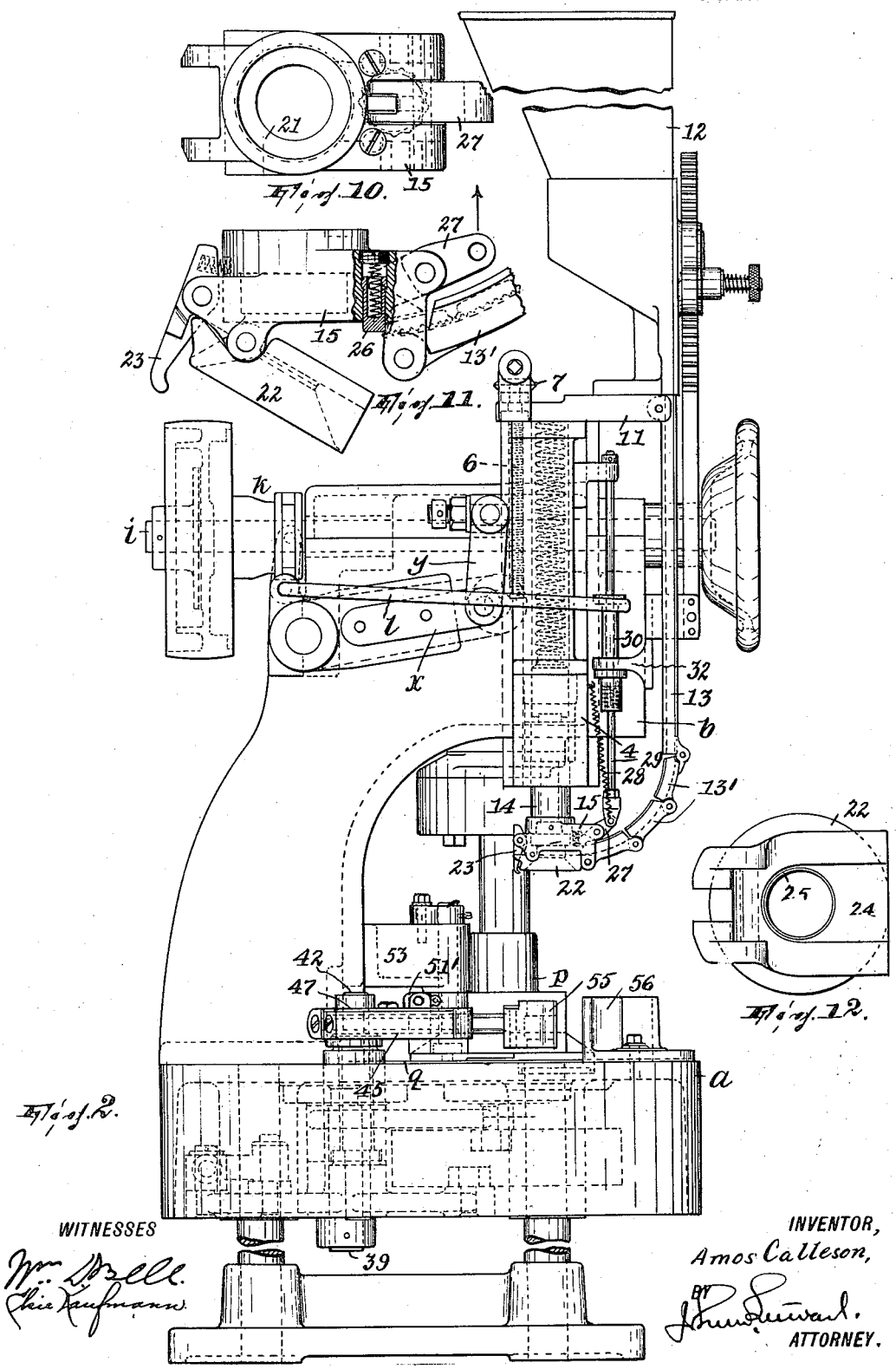

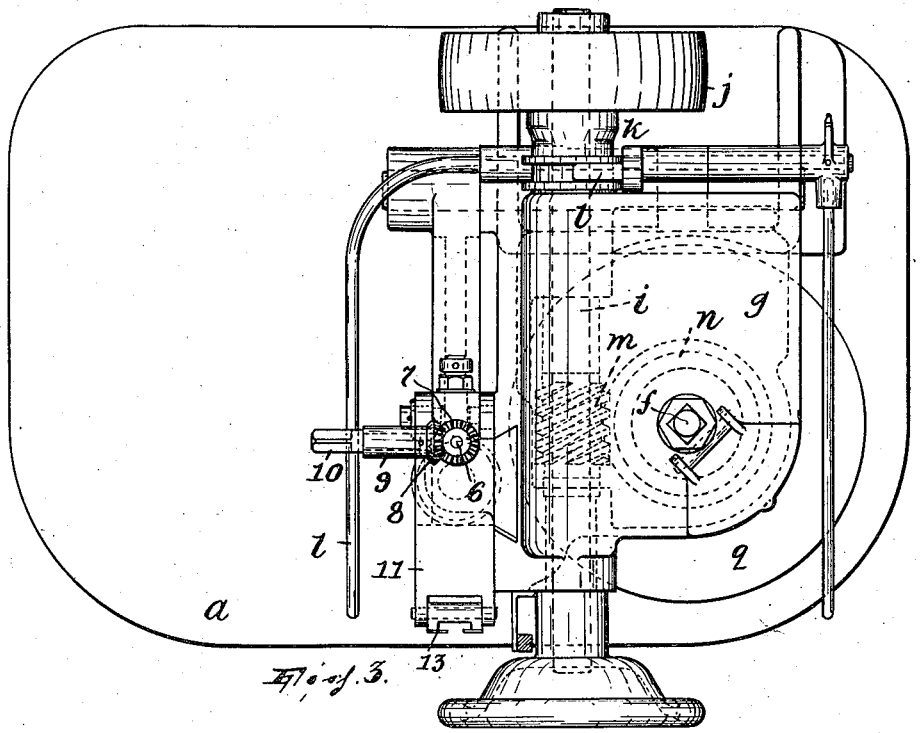
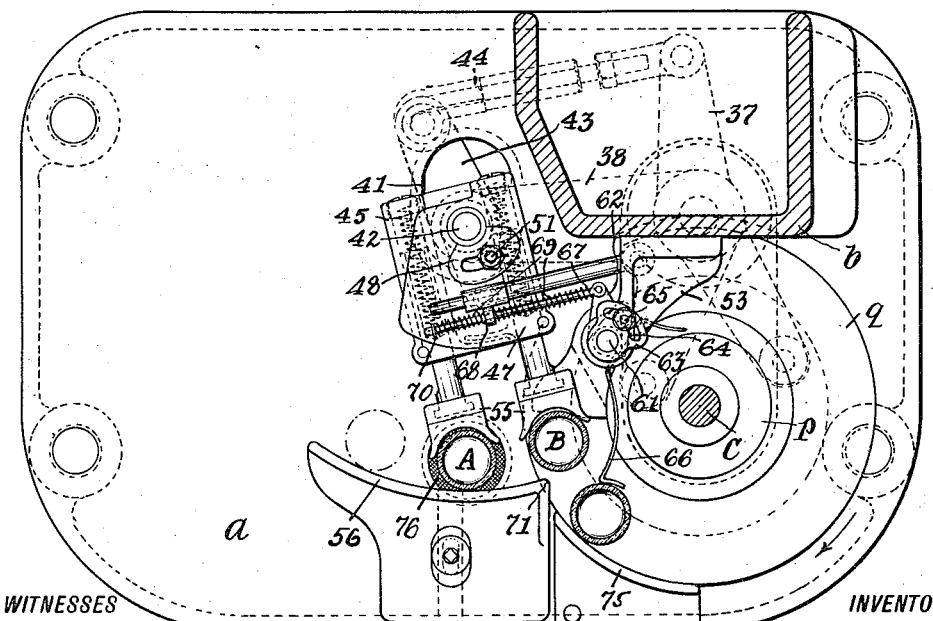

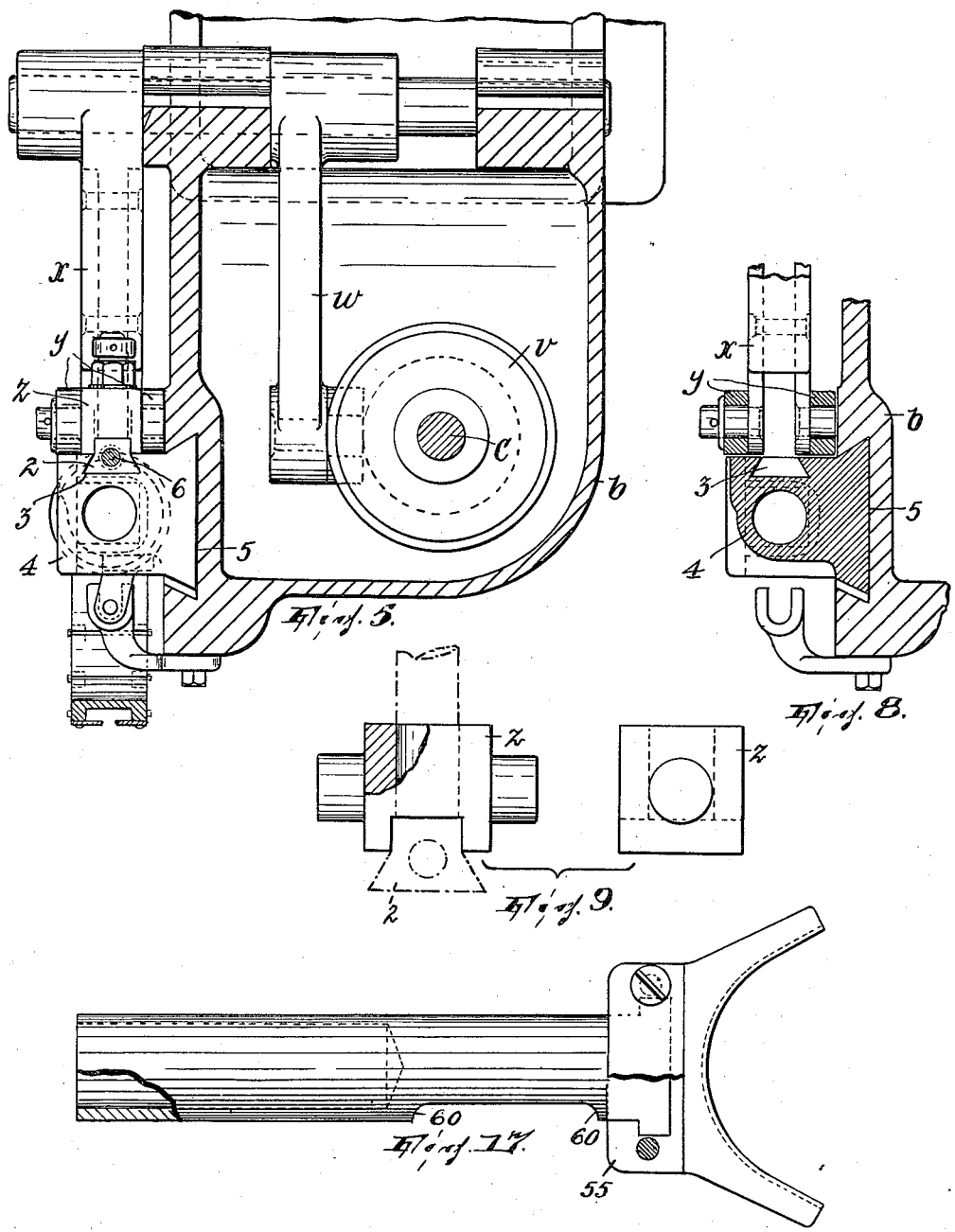

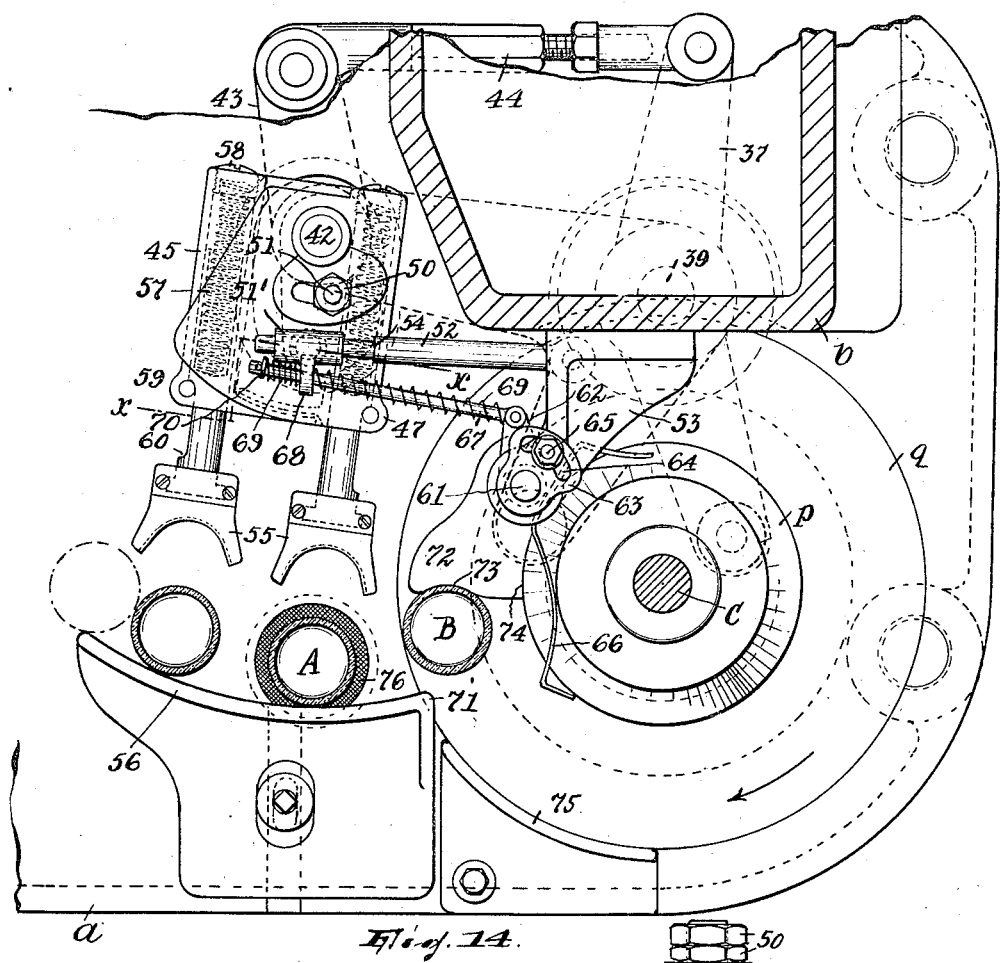

UNITED STATES PATENT OFFICE.

AMOS CALLESON, OF BROOKLYN, NEW YORK, ASSIGNOR TO BENJAMIN ADRIANCE, OF BROOKLYN, NEW YORK.

BOTTLE-SEALING MACHINE.

1,153,174.      Specification of Letters Patent.      Patented Sept. 7, 1915.

Application filed October 6, 1913. Serial No. 793,523.

*To all whom it may concern:*

Be it known that I, AMOS CALLESON, a citizen of the United States, residing at Brooklyn, in the county of Kings and State of New York, have invented certain new and useful Improvements in Bottle-Sealing Machines, of which the following is a specification.

This invention relates to bottle sealing machines and the like and particularly to machines of this general class in which the bottles or other containers are automatically advanced past the sealing point, thus leaving it to the attendant only to feed the containers to the feeding means and remove them from the machine as fast as they are sealed.

The salient features of the present invention as represented in the machine hereinafter described and shown in the accompanying drawings by way of illustration of one embodiment thereof, in which machine the containers while in transit are brought to a standstill while the sealing operation is performed by a sealing means which has not lateral movement with the containers, may be briefly indicated as follows: The frame includes an open hollow overhanging head or pedestal under the overhanging portion of which the containers are rotatively advanced by a feed table or container support onto the stationary table of the machine, to be then operated upon by the sealing means, said head carrying not only the sealing means but the principal portion of mechanism for reciprocating the sealing means vertically, rotating the feed table and performing certain other operations. The placement of the bottles in succession in position for the sealing operation is performed by a mechanism consisting, essentially, of a container-shifter having a plurality of container-receiving pockets opening laterally and moving in a horizontal plane in such a way that in one cycle of its movement it receives a container in one of its pockets and shifts it to the sealing position, and on the next it receives said container in another of its pockets and another in its first-named pocket and shifts the two, the second container to the sealing position and the first to the place for the sealed containers on the table of the machine, ready for removal by the attendant. Coactive with this shifter in accordance with the illustrated construction is a suitable wall for guiding the containers during the shifting.

Other features of the invention are a novel means for delivering and controlling the delivery of the closures from a suitable hopper to the sealing head; certain arrangements and construction of parts whereby the machine is adapted to be adjusted to suit containers varying in size; a novel means for timing the delivery of the bottles from the feed table; and a novel construction of sealing head.

Referring, now, to the accompanying drawings, Figure 1 is a front elevation of the machine; Fig. 2 an elevation of the left side thereof; Fig. 3 a plan, with the closure hopper removed; Fig. 4 a vertical sectional view in the plane of the shaft *c*; Fig. 5 a horizontal sectional view in the plane of the top of the cam *v*, certain parts appearing in elevation and others removed; Fig. 6 shows the sealing-head-including structure and mechanism concerned in the delivery of the closures to the sealing head partly in elevation and partly in vertical section; Fig. 7 is a vertical sectional view illustrating the compensating action of the sealing head in the plunger 4; Fig. 8 is a sectional detail view of said plunger and a part of its operating means; Fig. 9 shows elevations of the block *z*; Figs. 10 and 11 are a top plan and a side elevation, partly in section, of the throat-holder of the sealing-head and its pivoted mouth-piece, Fig. 12 being a top plan of said mouth-piece; Fig. 13 is a plan illustrating the container-feeding means, the position of the shifter thereof being in this figure at the inception of its movement to shift two bottles; Fig. 14 is a similar plan on a larger scale, the shifter being shown as having shifted said bottles, one out of and the other into position to undergo the sealing operation; Fig. 15 is a sectional view on line *x—x* of Fig. 14, and Fig. 16 is a vertical sectional view of the parts shown in Fig. 15 and at substantially a right angle to line *x—x*; and, Fig. 17 shows one of the jaws of the shifter.

*a* is a suitably supported table carrying the hollow head or pedestal *b* formed with a forward overhang (Figs. 2 and 4). The vertical rotary shaft *c* carries a fixed sleeve *d* supported by a step-bearing *e* secured to the overhang of head *b*, a set screw *f* in the removable cover *g* of the head bearing against the upper end of the shaft; *h* is a bearing for the lower end of the shaft.

*i* is the drive shaft, *j* its driving pulley, *k* its clutch and *l* the clutch controlling lever, and *m* and *n* gearing connecting the shafts *c* and *i*.

*o* is a sleeve or hollow shaft revoluble on shaft *c*, the same carrying at its lower end the hub *p* for a thin disk-like bottle carrier or feed table *q* and at its upper end having a pinion *r* meshing with one of two integral transmission pinions *s* and *t*, the other of which meshes with a pinion *u* formed on said shaft *c*.

Shaft *c* carries, housed in the overhang of the head, a barrel cam *v* with which engages a roller on the arm *w* of a two armed lever fulcrumed in said head, the other arm *x* of which has its free end connected by a pair of links *y* with a block *z* (Figs. 5 and 9) having fixed thereto a projecting dove-tailed tongue 2 movable longitudinally of and in a vertical dove-tailed groove 3 formed in a plunger 4 having a dove-tailed portion movable in a vertical dove-tailed groove 5 in one side of head *b*. Into block *z* is tapped the vertical adjusting screw 6 suitably swiveled in the plunger and carrying at its upper end a bevel pinion 7 meshing with a bevel pinion 8 journaled in a bracket 9 on the plunger, the shaft 10 of the pinion 8 being squared to receive a wrench or the like. On turning the screw through the medium of the bevel pinions it will be apparent that the elevation of the plunger will be changed relatively to the block; thus the downward limit of movement of the plunger, as it is caused to reciprocate from the barrel cam by the two armed lever, links, block and screw, may be altered to suit bottles of different height.

It will be observed that the principal moving parts so far described are not only readily assembled but easily accessible largely because of the overhanging and open character of the head *b*.

A bracket 11 on the plunger supports the closure supply hopper 12 having a means (forming no part of the present invention) for agitating the closures and delivering them in properly faced disposition to the chute 13.

The machine is adapted to compensate for bottles varying in but supposed to be of uniform height in a way not forming a part of the present invention (being claimed in my application Serial No. 673,170, filed January 24th, 1912) but briefly described in connection with Figs. 6 and 7 thus: The body part 14 of the sealing head, the same carrying the throat-holder 15 containing a sealing throat or other means for bending the flaring flange of a "crown" into locking engagement with the shoulder on a bottle, may slip vertically in the plunger 4, being normally held down against a shoulder 16 by a spring-pressed stem 17. A rocking detent 18 supported by the body part 14, is normally held by said stem with mutually inclined surfaces 19, 19′ abutting each other, so that the body part is locked to the plunger against relatively upward movement therein. But when the plunger descends and forces the throat holder down over the mouth of the bottle, on account of the stem being prevented by the bottle from continuing the full downward stroke with the plunger (and if the bottle is above a predetermined height), an inclined shoulder 20 on the detent falls below the inclined shoulder 20′ on the stem, allowing the detent to rock out of the locking position, so that the body part 14 no longer descends with the plunger. On each upstroke of the plunger, the spring pressed stem holds the detent depressed until the surfaces 19, 19′ again coincide, when the detent rocks into the original position, the body part 14 now rising with the plunger, positively locked thereto ready for the next sealing operation. The sealing head is thus, on each working stroke, at first forced positively down over the closure, at which time the bending of the latter into locking engagement with the bottle occurs, and then, if the bottle exceeds a predetermined height, it yields or slips in the (still) descending plunger.

The throat-holder 15 is screwed onto the body-part 14 and has the usual annular seat 21 for the sealing device (not shown). The lower end-portion of the chute, formed as pivotally connected links 13′ whereby to allow the compensating movement of the sealing head relatively to the fixed part 13 of the chute, is attached to the throat-holder so as to discharge in a plane below the same. The mouth-piece 22 is pivoted to the throat-holder so as to swing downwardly on a horizontal axis, such movement being limited by the throat-holder, and when it is held in its normal position (Fig. 2) by the latch 23 its inlet 24, leading to the closure-supporting seat 25, alines with the guideway of the chute. The mouth-piece is swung downward to facilitate access to the interior of the throat-holder, and to block the debouch of the closures at this time spring-pressed detents 26, normally held raised by the mouth-piece, are forced a limited distance downwardly into checking relation to said closures (Fig. 11).

In the movements of the sealing head incident to sealing, the closure following that being attached to a bottle is forced by the column of closures toward the seat 25, tending to obstruct the free telescopic movements of the bottle and sealing head and sometimes in fact preventing the bottle from clearing the sealing-head under the ejecting pressure of the stem 17. To therefore prevent the column of closures from interfering in this way with the bottle I pivot in the throat-holder a pawl 27 the inner end of which a spring 28 normally holds in obstructing relation to the closure column and to the outer end of which is pivotally attached a vertical rod 29 guided in the plunger 4 and carrying a head 30, having a slip-friction-grip on the rod and provided with two spaced stops 31 between which projects a forked abutment 32 carried by the head b. Since the movement of part 27 is pivotal and of part 29 rectilinear, the connection between these two is a lost-motion connection. The head 30 has screwed thereon a removable cap 33 which has one of the stops 31 and which contains a spring pressed hollow cone 34 acting to press a leather or similar friction cone 35 into gripping relation to the rod 29. When the plunger rises, the lower stop 31 engages the abutment 32, so that the head 29 rocks the pawl 27 out of obstructing relation to the closure column; when the plunger descends for the sealing operation and during a part of its return movement spring 28 holds the pawl 27 in the position to sustain the closure column and prevent its interference with the bottle being sealed. It will be apparent that when the plunger 4 is adjusted as already described the head 30 of the rod becomes shifted to a new position on the rod by contact of one of its stops 31 with the abutment 32.

The lower end of shaft c carries a two-faced cam 36 with which engage rollers on the lever 37 and the bell-crank lever 38 fulcrumed on the stub-shaft 39. The upwardly projecting hub 40 at the free end (Fig. 15) of bell-crank lever 38 oscillates in an opening 41 in the table a. Said hub affords a bearing for a rock-shaft 42 having a crank 43 at its lower end which is connected with the lever 37 by the adjustable link 44. Secured on the upper end of rock-shaft 42 is the (relatively) fixed member 45 of a carrier for certain bottle-receiving jaws, said member having the upstanding hub 46 for the pivoted member 47 of said carrier. (The member 45 supports the rock shaft in the hub 40.) Member 47 is held between fiber or other friction plates 48, one of which is supported by member 45 and the other pressed downwardly by a spring 49 coiled between the same and nuts 50 on a stud 51 rising from member 45 and penetrating an arcuate slot in member 47 and the upper friction plate. An upstanding T 51' is pivoted in member 47, receiving in its horizontal (tubular) part a rod 52 pivoted to the bracket 53 attached to the head b, the same having a shoulder 54 to be abutted by the T as will appear. In members 45 and 47 are arranged, one in each, the (normally) substantially parallel stems of jaws 55 pressed forward, i. e., toward a suitably curved guide 56 on the table a, by springs 57 (housed in said members between said stems and adjusting screws 58) to limits afforded by pins 59 each disposed between shoulders 60 in the corresponding stem. The carrier and its jaws constitute the aforesaid shifter. The cam 36 is so formed that the resultant of the oscillation of the shifter around stub-shaft 39 (transmitted by lever 38) and its oscillation with rock-shaft 42 (transmitted by lever 37) is a movement of each jaw of the shifter in a cycloidal path which is part way substantially parallel with guide 56, then retreats therefrom, then extends to the right and then toward the guide.

Bracket 53 affords a bearing for a rock shaft 61 which, at the under side of the bracket, carries a crank 62 and at the upper side of the bracket a head 63 formed with an arcuate slot 64 receiving a stud 65 on the bracket whose function it is, on contact of the ends of the slot therewith, to limit the rocking motion of the parts 61, 62 and 63. 66 is an arm in the form of a plate suitably attached to the crank 62 and having its free end angular in form. The crank has pivotally attached thereto a rod 67 which penetrates an ear 68 on the T 51', coiled springs 69 on the rod being interposed respectively between said ear and the crank on the one hand and the ear and a stop 70 on the rod on the other hand. The acting face of the guide 56 follows a curve which intersects the circular path in which the feed table q advances the bottles and at the point 71 said guide forms an angle adjacent the edge of the feed table. Beyond this angle relatively to the direction of advance of the bottles on the feed table a bottle stop 72 is arranged, the same being preferably a plate disposed below the plane of movement of the adjacent jaws 55 and having its acting edge 73 preferably recessed for the reception of the bottles. This plate may be carried by the rock shaft 61, being kept from turning thereon by having a concave edge 74 fitted to the hub p. In oscillating the angle part of the arm 66 swings toward and from the angle 71 of the guide 56.

75 is a guide forming with the hub p an arcuate runway for the bottles placed on the feed table.

76 is an elastic bottle-seat placed under the sealing head.

Operation: It will be understood that the motions imparted to the feed-table q and the shifter by sleeve o and shaft c are continuous, and that the descending movement of the plunger 4 for sealing occurs while the shifter is performing that part of its movement including retreating from and approaching the wall or guide 56; at the time when the shifter is moving to the left, coöperating with the guide 56 to shift bottles, the plunger is more or less elevated, the sealing-head being clear of the bottles last sealed. On its movement toward the guide 56 the jaws of the shifter receive a (sealed) bottle (A) on the bottle-seat 76 and a bottle (B) (unsealed) abutting the stop 72 and on its ensuing left-hand movement it places the bottle A on the stationary table $a$ and bottle B on the bottle-seat. The bottles placed on the feed-table by the attendant are successively brought by the feed-table against the stop 72, in position to be moved to the left on the next ensuing left-hand stroke of the shifter. To preserve the waiting bottle from disturbance by the others (relatively behind it) being advanced by the feed-table, possible resulting in its being upset or crowded out of the recess 73 (the most favorable position thereof for the shifter to receive it), the angular end of the arm 66 is forced by the shifter on its motion to the right toward the angle 71, thereby temporarily checking the advance of these other bottles; when the shifter now moves to the left, said arm is retracted so that another bottle can come to rest against the stop 72, taking the place of the one removed by the shifter. If, for any reason, a jam occurs at the critical point, that is, between wall 56 and stop 72 (usually due to a bottle, assuming a tilting position), and assuming that the right-hand jaw 55 catches the jammed bottle, such jaw and member 47 of the shifter yield (turning on hub 46 as an axis) as the rest of the shifter swings around shaft 42 to the left, and the crushing of the bottle is avoided; the parts are restored to their normal condition by the T 51' abutting shoulder 54 of rod 52 on the next movement of the shifter to the right and will remain so, or the yield will occur again, according as the delinquent bottle will or will not now respond to the effort of the shifter to advance it. It will be understood that the shifting part of the movement of the pair of jaws or equivalent bottle holders is substantially equal to the center-to-center spacing of said jaws, whereby the left-hand jaw upon approaching to shift the bottle placed on the bottle-seat by the right-hand jaw will register with said bottle.

The arrangement in the present construction of the bottle-receiving and advancing means $q$ under the overhang of the head, with the means for exerting closing pressure on the bottle arranged on one side of the head, makes it possible to make the machine more compact and space-saving, it being unnecessary to extend the table laterally for the reception of the bottles except in one direction, as will be seen in Fig. 13.

Having thus fully described my invention, what I claim as new and desire to secure by Letters Patent is:—

1. In combination, a table and a pedestal upstanding from the table and having a forwardly projecting overhang, a rotary container-supporting means arranged under the overhang and having its axis of rotation extending vertically therethrough, a sealing means arranged laterally of and on the overhang, means to shift the containers past the sealing means in a direction lateral of the overhang, and means to actuate the sealing, container-supporting and shifting means.

2. In combination, a table and a pedestal upstanding from the table and having an overhang, a vertical rotary structure journaled in and depending from the overhang, a sealing means movable up and down in the overhang, a rotary container-support concentric with said structure and arranged below the overhang, means, carried by the overhang, for transmitting power from said structure to the sealing means and container support, and means to rotate said structure.

3. In combination, a table and a pedestal upstanding from the table and having an overhang, a vertical rotary structure journaled in and depending from the overhang, a sealing means movable up and down in the overhang, a rotary container-support concentric with said structure, arranged below the overhang and supported on the table, means, carried by the overhang, for transmitting power from said structure to the sealing means and container support, and means to rotate said structure.

4. In combination, a suitable supporting means, a closure supply source and a sealing head arranged in the supporting means and movable therein one relatively to the other, the sealing head being arranged below the closure supply source, and a chute leading down from and attached at its upper end to the closure supply source and having its lower end attached to the sealing head, the lower end portion of the chute consisting of a number of pivotally connected sections arranged in a curve and the remainder of the chute being inflexible.

5. In combination, the frame, a sealing-head-carrying structure movable therein, means to deliver a normally advanced line of closure to the sealing head, an obstructing device for the line of closures engageable with the latter relatively behind the closure about to be applied and movable in said structure, and motion transmitting means connecting said device with a part of the frame.

6. In combination, the frame, a sealing-head-carrying structure movable therein, means to deliver a normally advanced line of closures to the sealing head, a pivoted pawl for obstructing the line of closures engageable with the latter relatively behind the closure about to be applied and movable in said structure, and motion transmitting means connecting said pawl with a part of the frame.

7. In combination, the frame, a sealinghead-carrying structure reciprocating therein, the part of said structure including the sealing head being adjustable in the direction of reciprocating of said structure, means to deliver a normally advanced line of closures to the sealing head, and an obstructing means for the line of closures movable in and with the adjustable part of said structure and yieldably attached to the frame.

In testimony whereof I affix my signature in presence of two witnesses.

AMOS CALLESON.

Witnesses:
F. H. MOSES,
HENRY J. FLOOD.